US006157090A

United States Patent [19]

Vogel et al.

[11] Patent Number: 6,157,090

[45] Date of Patent: Dec. 5, 2000

[54] ELECTRONIC CHILD SAFETY LOCKS

[75] Inventors: Mark S. Vogel, Troy; Jeffrey C. Hendry, Waterford; Stephen J. Greene, Ann Arbor, all of Mich.

[73] Assignee: DaimlerChrysler Corporation, Auburn Hills, Mich.

[21] Appl. No.: 09/376,255

[22] Filed: Aug. 18, 1999

[51] Int. Cl.[7] .......... B60L 1/00

[52] U.S. Cl. .......... 307/10.1

[58] Field of Search .......... 307/10.1, 10.2, 307/9.1; 340/426, 438, 825.18; 70/264

[56] References Cited

U.S. PATENT DOCUMENTS

| | | |
|---|---|---|
| 3,722,615 | 3/1973 | Okada et al. . |
| 4,652,768 | 3/1987 | Gmeiner et al. . |
| 4,676,082 | 6/1987 | Huber et al. . |
| 4,709,776 | 12/1987 | Metz . |
| 4,870,409 | 9/1989 | Ogino . |
| 4,895,009 | 1/1990 | Kleefeldt et al. . |
| 5,168,733 | 12/1992 | Rathmann et al. . |
| 5,534,846 | 7/1996 | Kuroda . |
| 5,747,885 | 5/1998 | Dochtermann et al. . |
| 5,894,906 | 4/1999 | Weber .......... 180/274 |

*Primary Examiner*—Stephen W. Jackson
*Assistant Examiner*—Sharon Polk
*Attorney, Agent, or Firm*—Roland A. Fuller, III

[57] ABSTRACT

An electronic child safety lock system in which an electronic switch in the front seat area of the vehicle provides input signal to a body control module. The body control module determines whether the lockout switch is in a locked or an unlocked position. The body control module generates control signals to operate electronic actuators to lock and unlock the child door lockout device, thereby enabling and disabling the rear doors from being opened from the interior of the vehicle.

7 Claims, 2 Drawing Sheets

ELECTRONIC CHILD SAFETY LOCKS

BACKGROUND OF THE INVENTION

1. Field of the Invention

The present invention relates to child safety locks and, more particularly, to rear door child safety locks which can be actuated and deactuated remotely from the operator console.

2. Discussion

The use of child safety locks in a vehicle is well known. In order to prevent a child from opening a rear door from within the vehicle, many vehicles come equipped with a latch mechanism which when actuated disables operation of the interior door latch, thereby preventing a child from opening the rear door from within the vehicle. When the safety lock mechanism has been actuated, the rear door may only be opened from outside the vehicle.

Currently, child safety locks installed on existing vehicles utilize mechanical latches which are generally located on the door jam of the rear passenger doors. When the child safety locks are activated, the child safety locks effectively disable the rear passenger interior door latches, preventing them from being opened from the interior of the vehicle.

The use of child safety locks sometimes proves inconvenient when children and adults intermittently use vehicle back seats. Specifically, with the child safety locks activated, adults cannot be let out of the car until the rear door is opened from outside the vehicle. If the safety mechanism has not been switched from the deactivated position, such a situation proves inconvenient to both the driver and passengers alike. The driver or front seat passenger must exit the vehicle and open the rear door to enable the rear passengers to exit the vehicle.

Thus, it is an object of the present invention to provide a remotely activated child safety lock.

It is yet a further object of the present invention to provide a control module for actuating and deactuating the child safety locks.

It is yet a further object of the present invention to provide an electronically actuated mechanism for activating and deactivating the child safety locks.

SUMMARY OF THE INVENTION

This invention is directed to a safety lock system for a vehicle door. The safety lock system includes an interior door latch having a latched position and an unlatched position, wherein in the unlatched position, the door may be opened and in a latched position, the door may not be opened. A lockout device operatively connects to the door latch and has a locked out position which disables operation of the door latch and an operative position which enables operation of the door latch. A switch located remotely from the lockout device has a locked and an unlocked position, wherein the switch outputs a first electrical signal corresponding to the locked position and outputs a second electrical signal corresponding to the unlocked position. A control module receives the first and second electrical signals for the switch and generates a control signal that varies in accordance with the first and second electrical signals. An actuator responds to the control signal and displaces the lockout device between the locked out and the operative positions.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
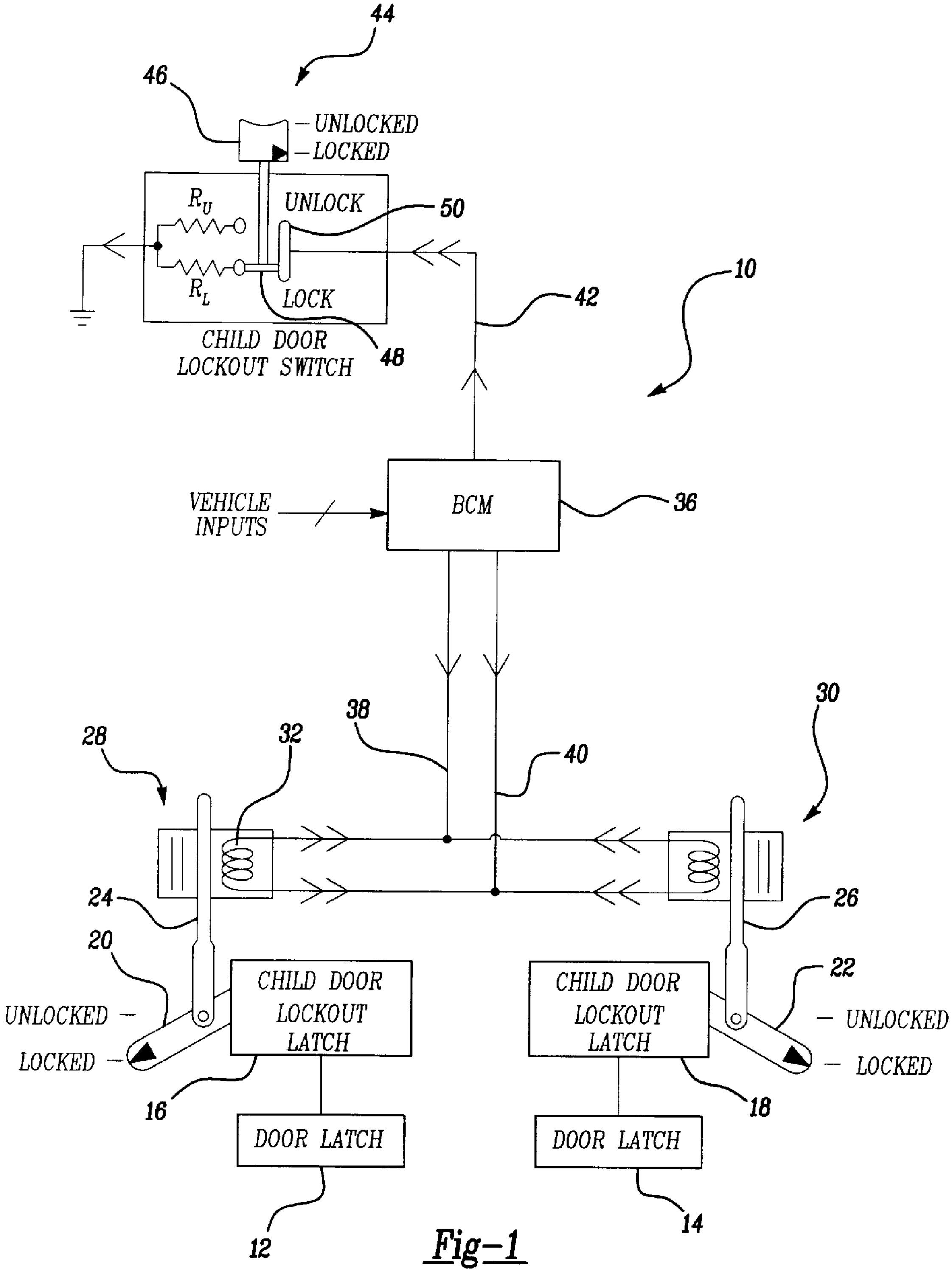
FIG. 1 is a block diagram of the child safety lock control circuit arranged in accordance with the principles of the present invention.

FIG. 1 is a block diagram of the child safety lock system 10 arranged in accordance with the principles of the present invention. A left interior door latch 12, preferably for a rear door, is mechanically connected to a left child door lockout latch 16. The child door lockout latch 16 includes an actuating lever 20 which may be displaced between a locked position in which the interior door latch 12 cannot open the door and an unlocked position in which interior door latch 12 may open the door. Actuating lever 20 may be manually operated, such as by the vehicle operator. In addition, actuating lever 20 may be operated by displacing an actuating rod 24, one end of which rigidly connects to actuating lever 20. The other end of actuating rod 24 connects to and is displaceable via an actuating assembly 28.

Actuating assembly 28 is an electromechanical device which displaces actuating rod 24 in response to a control signal, as will be described herein. Preferably, actuating assembly 28 is embodied as a solenoid, motor, stepper motor, or other electromechanical device displaced in response to an electronic signal. Preferably, actuating assembly 28 includes a coil 32. Coil 32 receives an electrical signal which causes coil 32 to generate a magnetic force which displaces actuating rod 24 in a predetermined direction. Actuating assembly 28 may include a biasing member, such as a spring, to displace actuating rod 24 in a direction opposite to the displacing force generated by coil 32. Alternatively, the signal applied to coil 32 may be reversed in polarity to cause coil 32 to exert a magnetic force in an opposite direction, thereby displacing actuating rod 24 accordingly.

Similarly, a right interior door latch 14, preferably for a rear door, is mechanically connected to a right child door lockout latch 18. The child door lockout latch 18 includes an actuating lever 22 which may be displaced between a locked position in which the interior door latch 14 cannot open the door and an unlocked position in which interior door latch 14 may open the door. Actuating lever 22 may be manually operated, such as by the vehicle operator. In addition, actuating lever 22 may be operated by displacing an actuating rod 26, one end of which rigidly connects to actuating lever 22. The other end of actuating rod 26 connects to and is displaceable via an actuating assembly 30.

Actuating assembly 30 is an electromechanical device which displaces actuating rod 26 in response to control signals, as will be described herein. Preferably, actuating assembly 30 is embodied as a solenoid, motor, stepper motor, or other electromechanical device displaced in response to an electronic signal. Preferably, actuating assembly 30 includes a coil 34. Coil 34 receives an electrical signal which causes coil 32 to generate a magnetic force which displaces actuating rod 26 in a predetermined direction. Actuating assembly 34 may include a biasing member, such as a spring, to displace actuating rod 26 in a direction opposite to the displacing force generated by coil 32. Alternatively, the signal applied to coil 32 may be reversed in polarity to cause coil 32 to exert a magnetic force in an opposite direction, thereby displacing actuating rod 26 accordingly.

The respective actuating assemblies 28, 30 are actuated in accordance with a control signal generated by a body control module (BCM) 36. Body control module 36 generates an electronic control signal on a pair of output lines 38, 40. The polarity of the signal applied to output lines 38, 40 may be reversed in order to operate actuating assemblies 28, 30 bidirectionally in order to correspondingly displace respective actuating rods 24, 26 bidirectionally. Body control module 36 receives vehicle inputs such as ignition, vehicle speed, gear selector position, and crash sensor signals via a vehicle bus or a dedicated body control module bus. Body control module 36 also receives an input signal on an input line 42. Input line 42 connects to a lockout switch 44.

Lockout switch 44 comprises a push switch 46 which toggles between a locked position and an unlocked position. When in an unlocked position, push switch 46 is in a raised position, thereby displacing conductor 48, upward to provide a current path from input line 42 through input terminal 50, conductor 48, and unlocked resistor $R_U$ to ground. Similarly, when push switch 46 is in a locked position, conductor 48 is displaced downwardly, providing a current path from input line 42 through input terminal 50, conductor 48, and locked resistor $R_L$ to ground. Resistors $R_U$ and $R_L$ preferably have different resistance values, thereby varying the current from input line 42 to ground. Body control module 36 monitors the current through input line 42 in order to determine whether lockout switch 44 is in a locked or an unlocked position. Based on current flowing through input line 42, body control module 36 generates output signals on output lines 38, 40 to correspondingly control actuating assemblies 28, 30, thereby actuating and deactuating child door lockout latches 16, 18. Body control module 36 may also use the other vehicle inputs to determine the signal provided on output lines 38, 40.

Figure 2:
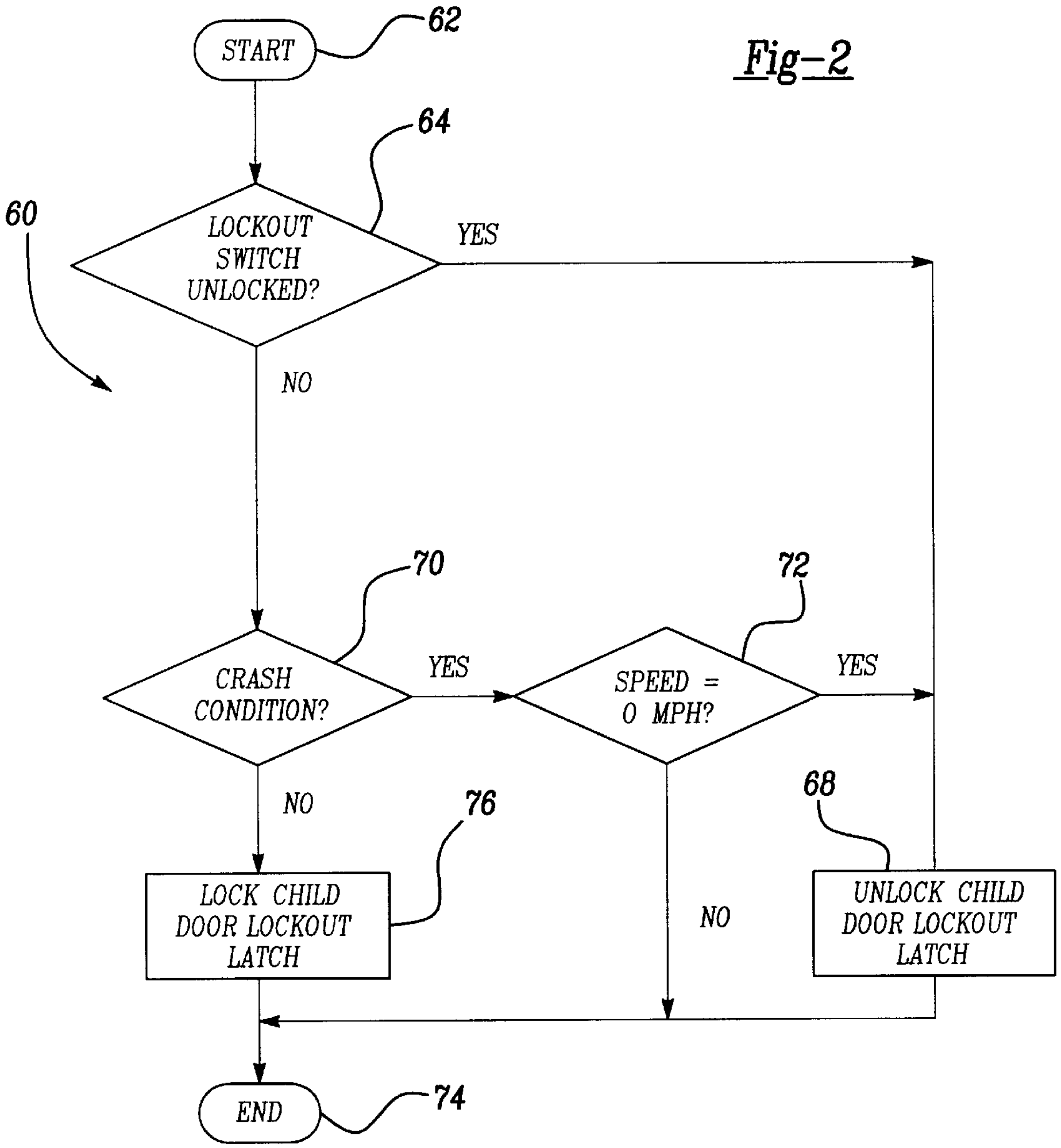
FIG. 2 is a flowchart of a control method for the operating child safety locks of the present invention.

FIG. 2 is a flowchart for a control method 60 implemented through body control module 36 to operate child door lockout latches 16, 18. It should be understood that in a simple mode of operation, the child door lockout latches 16, 18 operate in accordance with the position of lockout switch 44. The following description refers to a more complex mode of operation.

The method starts at block 62. Control proceeds to block 64. At block 64, the body control module determines if the lockout switch is in a locked or an unlocked position. If the lockout switch is in an unlocked position, control proceeds to block 68 where the body control module generates signals to unlock the child door lockouts. If the lockout switch is in a locked position, control proceeds to block 70. At block 70, if a crash condition is detected, control proceeds to block 72 where the vehicle speed is tested. A crash condition may be indicated by deployment of a vehicle airbag or input from deceleration sensors indicating deceleration above a predetermined threshold. If the vehicle speed is 0 MPH, control proceeds to block 68, where the child door lockouts are unlocked. If the vehicle speed is not 0 MPH, control proceeds to end block 74. Returning to block 70, if no crash condition is detected, control proceeds to block 76, where the child door lockouts are locked or maintained locked. Control then proceeds to end block 74.

From the foregoing, it can be seen that the present invention provides several advantages. In particular, the present invention enables the vehicle operator to control the child door lockouts from the operator console. In addition, the body control module as described herein enables application of an intelligent control system for selectively determining whether to lock or unlock the door lockout. Further, the present invention provides increased passenger convenience, as passengers will no longer need to wait for the front seat occupants to exit the vehicle and open the rear vehicle doors.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. A safety lock system for a vehicle door, comprising:

an interior door latch, the door latch having a latched position and an unlatched position, wherein in the unlatched position, the door may be opened and in a latched position, the door may not be opened;

a lockout device operatively connected to the door latch, the lockout device having a locked out position which disables operation of the door latch and an operative position which enables operation of the door latch;

a switch located remotely from the lockout device, the switch having a locked and an unlocked position, wherein the switch outputs a first electrical signal corresponding to the locked position and outputs a second electrical signal corresponding to the unlocked position, the switch including a push switch which toggles between the locked and the unlocked positions, a first circuit path having a first resistance and operative when the push switch is in the locked position, and a second circuit path having a second resistance and operative when the push switch is in the unlocked position;

a control module for receiving tie first and second electrical signals for the switch, the control module generating a control signal that varies in accordance with the first and second electrical signals; and an actuator, the actuator being responsive to the control signal, wherein the actuator displaces the lockout device between the locked out and the operative positions.

2. The apparatus of claim 1 wherein the actuator comprises a solenoid having a member operatively connected to the lockout device, the solenoid being responsive to the output signal to displace the member, thereby displacing the lockout device between the locked out and operative positions.

3. The apparatus of claim 1 further comprising:

a second interior door latch for operating a second door, the second door latch having a latched position and an unlatched position, wherein in the unlatched position, the second door may be opened and in a latched position, the second door may not be opened;

a second lockout device operatively connected to the second door latch, the second lockout device having a locked out position which disables operation of the second door latch and an operative position which enables operation of the second door latch; and a second actuator, the second actuator being responsive to the control signal, wherein the second actuator displaces the second lockout device between the locked out and the operative positions.

4. The apparatus of claim 3 wherein the switch comprises:

a push switch which toggles between the locked and the unlocked positions;

a first circuit path having a first resistance and operative when the push switch is in the locked position; and a second circuit path having a second resistance and operative when the push switch is in the unlocked position.

5. The apparatus of claim 3 wherein the actuator comprises a solenoid having a member operatively connected to the lockout device, the solenoid being responsive to the output signal to displace the member, thereby displacing the lockout device between the locked out and operative positions.

6. A safety lock system for a vehicle door, comprising:

an interior door latch, the door latch having a latched position and an unlatched position, wherein in the unlatched position, the door may be opened and in a latched position, the door may not be opened;

a lockout device operatively connected to the door latch, the lockout device having a locked out position which disables operation of the door latch and an operative position which enables operation of the door latch;

a switch located remotely from the lockout device, the switch having a locked and an unlocked position, wherein the switch outputs a first electrical signal corresponding to the locked position and outputs a second electrical signal corresponding to the unlocked position, the switch including a push switch which toggles between the locked and the unlocked positions, a first circuit path having a first resistance and operative when the push switch is in the locked position, and a second circuit path having a second resistance and operative when the push switch is in the unlocked position;

a control module for receiving the first and second electrical signals for the switch, the control module generating a control signal that varies in accordance with the first and second electrical signals;

an actuator, the actuator being responsive to the control signal, wherein the actuator displaces the lockout device between the locked out and the operative positions;

a second interior door latch for operating a second door, the second door latch having a latched position and an unlatched position, wherein in the unlatched position, the second door may be opened and in a latched position, the second door may not be opened;

a second lockout device operatively connected to the second door latch, the second lockout device having a locked out position which disables operation of the second door latch and an operative position which enables operation of the second door latch; and a second actuator, the second actuator being responsive to the control signal, wherein the second actuator displaces the second lockout device between the locked out and the operative positions.

7. The apparatus of claim 5 wherein the actuator comprises a solenoid having a member operatively connected to the lockout device, the solenoid being responsive to the output signal to displace the member, thereby displacing the lockout device between the locked out and operative positions.

* * * * *